United States Patent [19]

Sasson

[11] Patent Number: 4,794,464
[45] Date of Patent: Dec. 27, 1988

[54] VIDEO TIME DIVISION MULTIPLEXER WITH PLURAL DUAL PORT MEMORIES

[75] Inventor: Steven J. Sasson, Springwater, N.Y.

[73] Assignee: Eastman Kodak Company, Rochester, N.Y.

[21] Appl. No.: 902,821

[22] Filed: Sep. 2, 1986

[51] Int. Cl.⁴ ............................................. H04N 9/81
[52] U.S. Cl. ...................... 358/310; 358/12; 360/23; 360/33.1
[58] Field of Search ............... 358/340, 320, 330, 335, 358/337, 339, 11-13, 133, 135, 141; 360/23, 33.1, 36.1, 36.2; 365/219

[56] References Cited

U.S. PATENT DOCUMENTS

| | | | |
|---|---|---|---|
| 4,035,832 | 7/1977 | Stalley et al. | 358/339 X |
| 4,068,258 | 1/1978 | Bied-Charreton et al. | 358/310 |
| 4,129,882 | 12/1978 | Limb | 358/13 |
| 4,138,694 | 2/1979 | Doi et al. | 358/339 |
| 4,163,247 | 7/1979 | Bock et al. | 358/310 X |
| 4,163,248 | 7/1979 | Heitmann | 358/13 X |
| 4,302,775 | 11/1981 | Widergren et al. | 358/13 X |
| 4,394,686 | 7/1983 | Horstmann | 358/320 X |
| 4,394,774 | 7/1983 | Widergren et al. | 358/13 X |
| 4,396,937 | 8/1983 | Reitmeier et al. | 358/13 |
| 4,467,368 | 8/1984 | Horstmann | 358/310 |
| 4,472,745 | 9/1984 | Foerster et al. | 358/310 |
| 4,517,597 | 5/1985 | Glenn | 358/12 X |
| 4,593,315 | 6/1986 | Willis et al. | 358/11 X |
| 4,628,344 | 12/1986 | Glenn | 358/133 X |
| 4,633,441 | 12/1986 | Ishimoto | 365/219 X |
| 4,672,443 | 6/1987 | Dischert et al. | 358/11 X |
| 4,672,446 | 3/1987 | Ikeda et al. | 358/11 X |

Primary Examiner—Raymond F. Cardillo
Assistant Examiner—W. R. Young
Attorney, Agent, or Firm—Robert M. Wallace

[57] ABSTRACT

A video signal is time division multiplexed prior to recording using a time base compression device including a random access memory, instead of serial shift registers or the like. Large time base errors in the incoming video signal are accommodated without creating conflicts between memory read and write operations of successive video lines and without requiring a spare memory. Instead, the time compression random access memory has dual data ports, and successive video lines are loaded into and unloaded out of different locations in the random access memory simultaneously through different ports at different data rates to achieve the requisite time compression. As a result, the usual requirement to route incoming video signals to a spare memory in case of a time base error, for avoiding memory read and write conflicts, is eliminated by the invention.

24 Claims, 11 Drawing Sheets

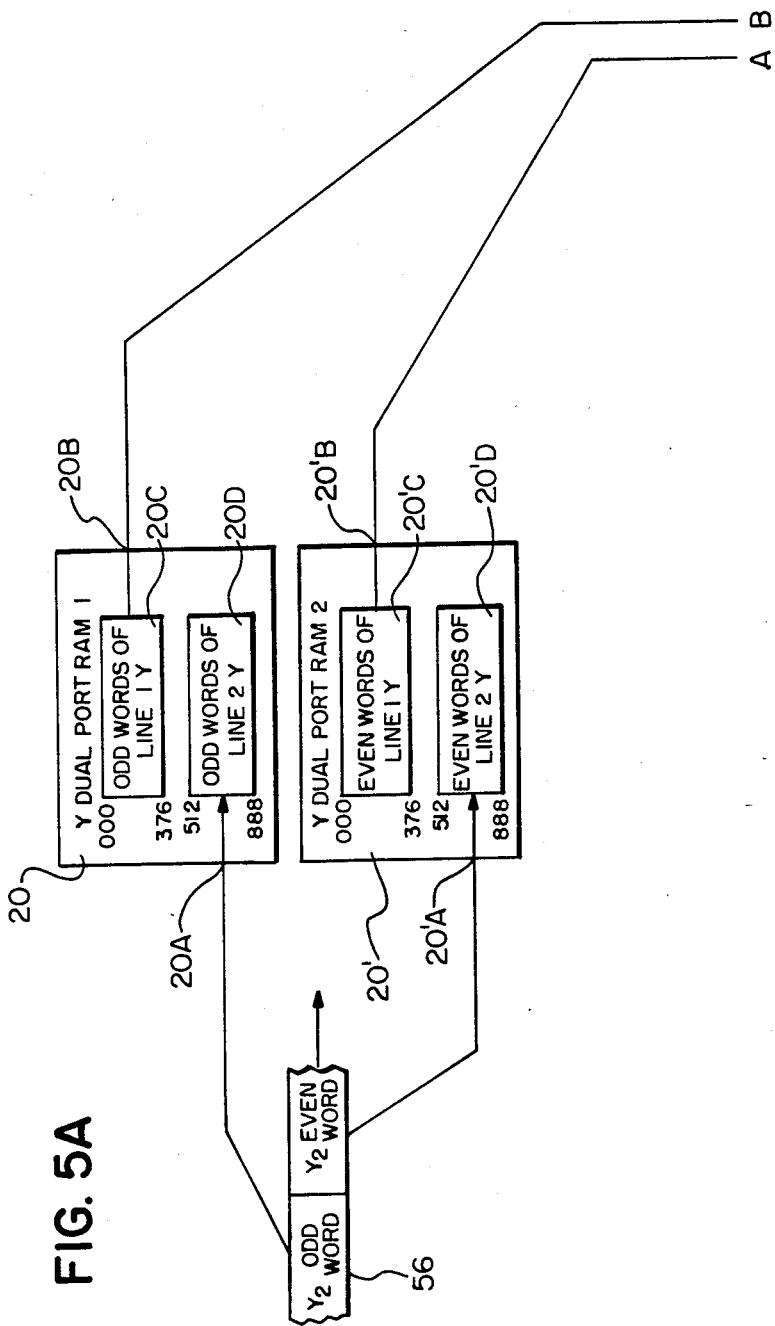

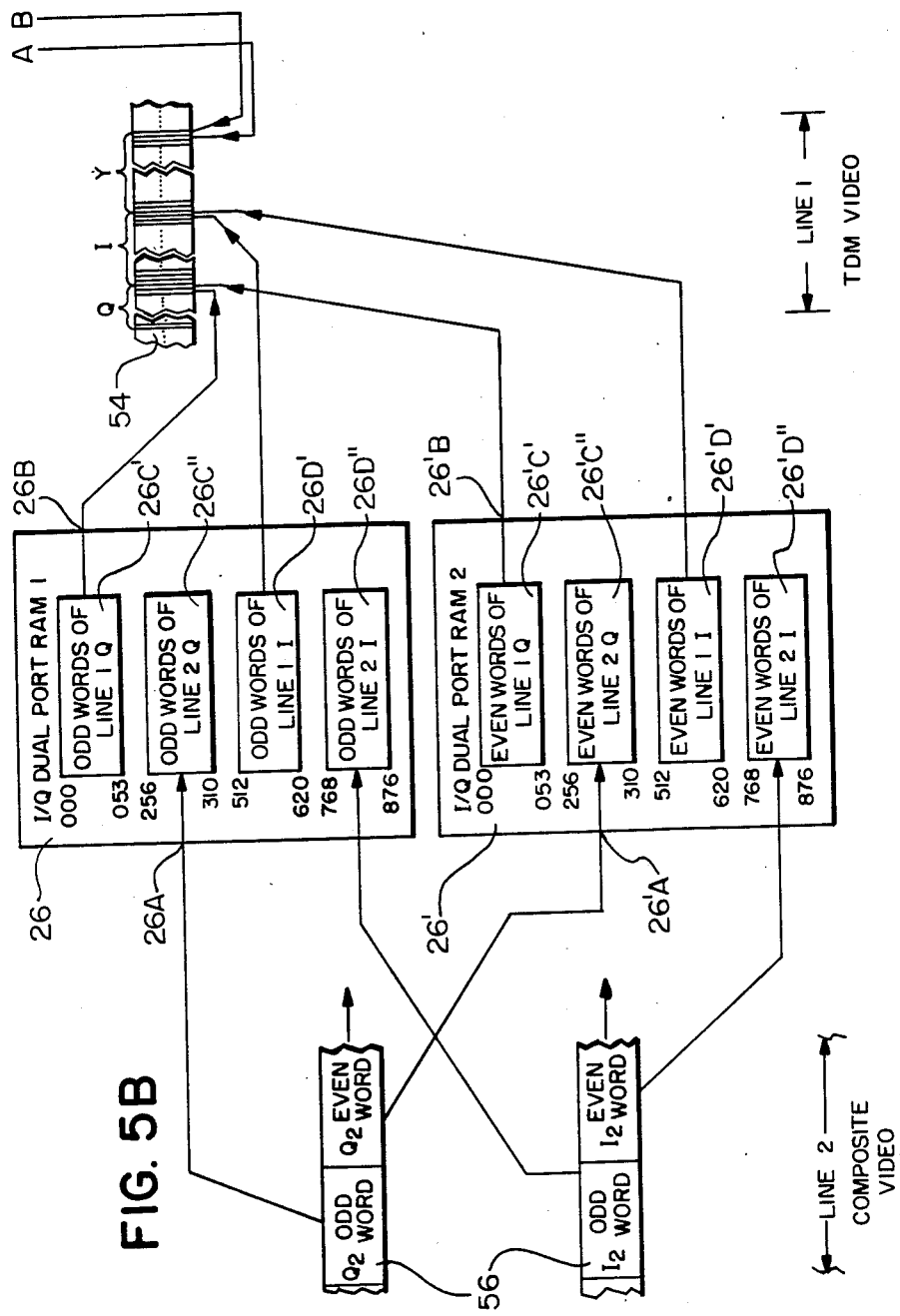

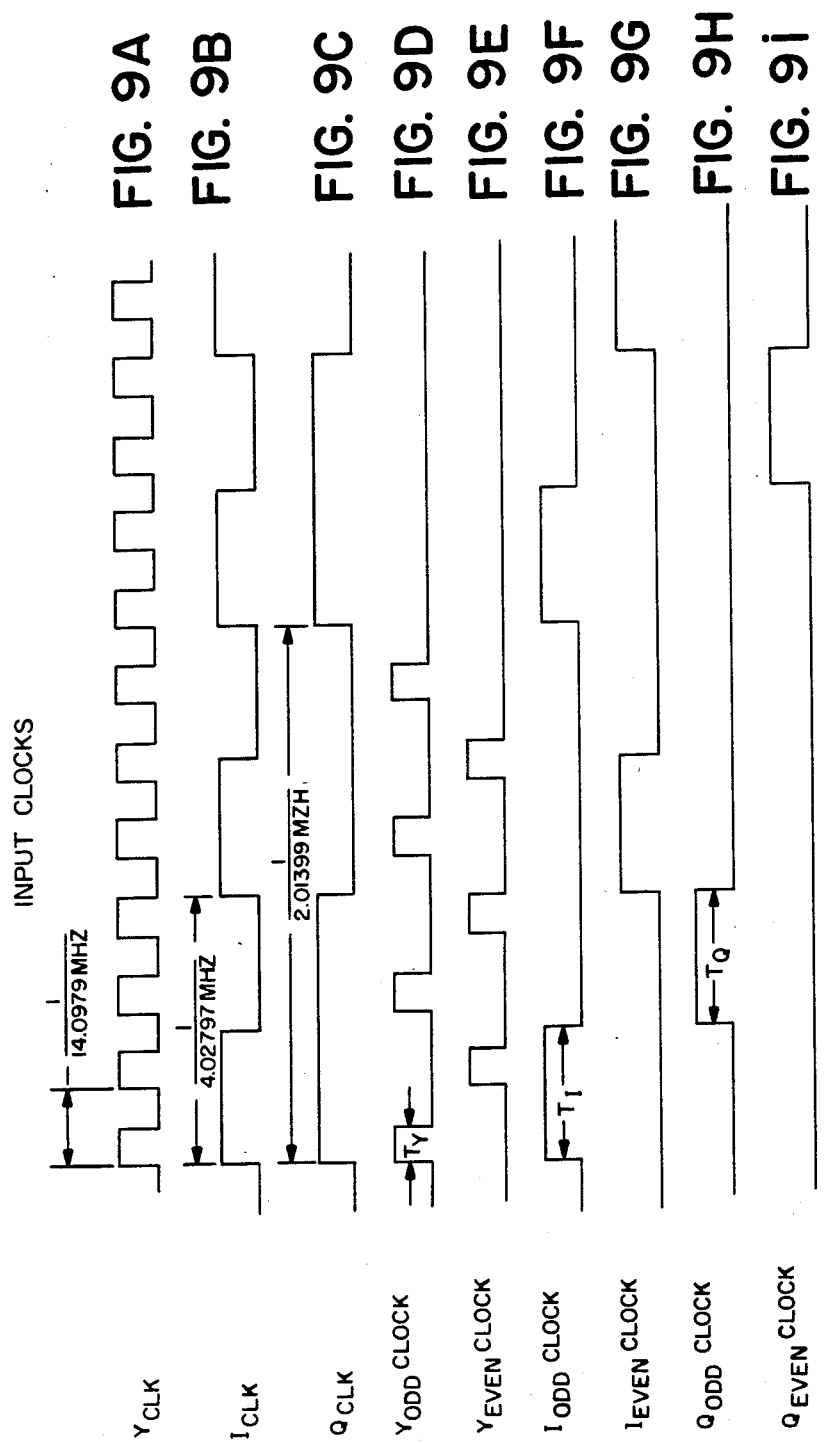

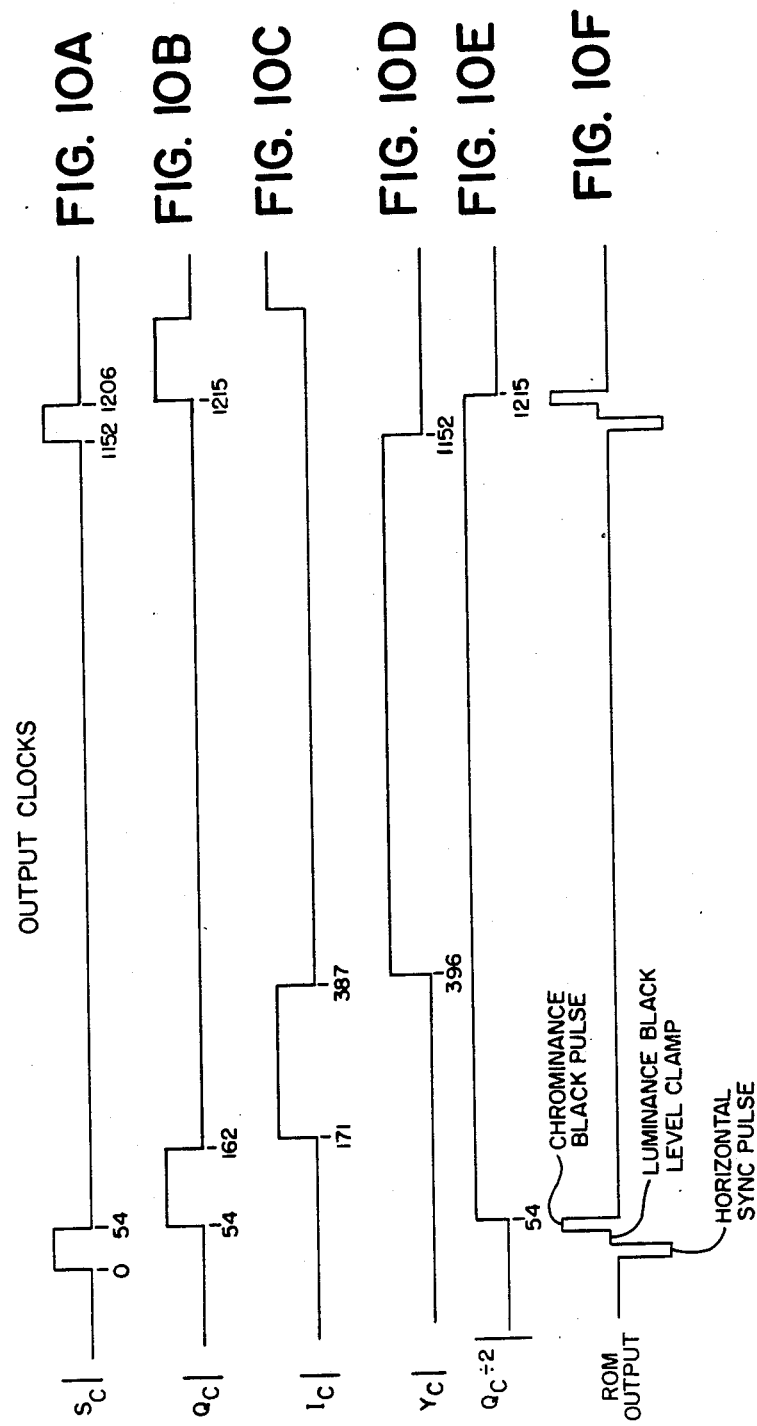

VIDEO TIME DIVISION MULTIPLEXER WITH PLURAL DUAL PORT MEMORIES

BACKGROUND OF THE INVENTION

1. Technical Field

The invention is related to time division multiplex video cassette recorders and the like which employ a random access memory, as opposed to serial shift registers or the like, to perform time base compression and expansion.

2. Description of the Related Art

Numerous methods are known for compacting video data and for reducing the bandwidth of video data in a video cassette recorder or other devices. Among these techniques are: splitting the video signal into high and low frequency bands and transmitting the bands separately (U.S. Pat. No. 4,068,258); differentially encoding the luminance and two chrominance components into a single video word and transmitting the single video word (U.S. Pat. No. 4,129,882); time division multiplexing luminance and chrominance components, as in a video camera output video format (U.S. Pat. No. 4,163,247).

Video time division multiplexing has been implemented using serial shift registers or first-in, first-out (FIFO) structures (U.S. Pat. No. 4,396,937). An improvement has been to eliminate the serial shift register or FIFO structure and substitute instead a random access memory or the like to perform the time base compression and expansion required in time division multiplexing. However, since successive video lines must be loaded and unloaded simultaneously for continuous data flow, two memories are required, instead of one, in a so-called "double buffered" memory structure such as that described in U.S. Pat. No. 4,472,745. In the double buffered memory time compression technique, successive video lines are loaded into and read out of two memories in alternate succession so that each memory is being loaded while the other is being unloaded at any one given time. Double buffering to achieve time base compression is a well-known technique (U.S. Pat. No. 4,467,368) and is useful in other applications such as time base error correction (U.S. Pat. No. 4,394,686) and field sequential video signal transmission (U.S. Pat. No. 4,163,248).

Random access memories are also useful in video signal processors for superimposing a pilot signal onto the video signal. This may be performed by interleaving and de-interleaving alternate video words stored in the memory with data words representing the pilot signal (U.S. Patent No. 4,138,694).

While random access memories are now a relatively old technology, dual-port random access memories have recently become available commercially, as described in *Advance Information/IDT 7130S/IDT 7130L*, Integrated Devices Technology, Inc., 3236 Scott Blvd., Santa Clara, Calif., 1985. Such dual-port random access memories do not appear to be useful in video signal multiplexing, because as they are limited to a maximum byte access frequency of about 11 MHz, according to published specifications. In contrast, video signal processing for time division multiplexing requires on the order of 18 MHz to achieve reasonable sampling rates.

3. Problem

It would be preferable to use random access memories, as opposed to serial shift registers or FIFO structures, to perform time base compression and expansion in video time division multiplexing. A random access memory is more versatile and can facilitate additional features, if desired (such as noiseless still-frame playback and multi-channel split-screen displays, for example). However, as previously described, in order to time compress a single video signal, such as the luminance component signal, two random access memories are required and a double buffering technique must be employed to permit the simultaneous loading and unloading of successive video lines of data for continuous data flow. Even with two memories, the system is vulnerable to loss of data due to conflicts between successive read and write operations in each memory caused by time base errors in the incoming video signal. Such data losses are avoided in the prior art by introducing a spare third memory which is pulled into action whenever a time base error occurs. A typical double buffering structure would include two memories A and B and a spare memory C which is available in case of time base errors.

In one example, video line 1 is unloaded from memory A while, simultaneously, video line 2 is loaded into memory B. A time base error occurs causing video line 3 to arrive early, before memory A has finished unloading video line 1. Since both memories A and B are presently occupied, video line 3 must be loaded into the spare memory C in order to avoid conflicts between read and write operations or the loss of video data line 3. Accordingly, it is apparent that this type of system requires some device for sensing time base errors (or sensing potential memory read and write conflicts caused by time base errors) and a multiplexing device to activate the spare memory in case of such time base errors. The problem is that the addition of a spare memory and multiplexer is relatively complex and costly. It is seemingly impossible to eliminate this additional expense without running the risk of significant data losses due to conflicts between memory read and write operations caused by time base errors.

SUMMARY OF THE INVENTION

It is a teaching of the present invention that the spare memory can be eliminated without data losses or conflicts between memory read and write operations, even in the presence of time base errors.

1. Solution to the Problem

Time division multplexing is performed with a random access memory having a plurality of separate and independent ports which permit simultaneous addressing of different data in separate locations in the memory. Successive lines of video data are simultaneously loaded and unloaded in separate memory locations at two different data rates characteristic of the time base compression required in the time division multiplexing process.

In the preferred embodiment, the memory comprises a plurality of dual port random access memory integrated circuits. Different ones of the integrated circuits store different ones of the color components of the video signal. Moreover, the video signal is digitized into 8-bit words and the odd and even words of each color component are separated and stored in different ones of the integrated circuits in order to reduce the data rate in each circuit by one half. The result is that the data rate at which the video signal is processed through the memory is much greater than the data rate in any one of the integrated circuits, so that the invention is not limited by the data access speed capability of the individual integrated circuits.

That no additional processing or spare memories need be employed in the invention to accommodate time base errors may be seen from the following example. Video line 1, previously loaded into one portion of the multi-port memory, is being unloaded at one port while video line 2 is being loaded at another port into another portion of the memory. Due to a time base error, video line 2 concludes early and video line 3 arrives for loading into the first portion of the memory before video line 1 has finished unloading. However, video line 3 may be accommodated without impacting video line 2 because, in this invention, it is simply loaded at the other port into the portion of the memory vacated by the earlier—just unloaded—part of video line 1. After video line 1 is finished unloading, video line 2 is unloaded while video line 3 continues to be loaded.

2. Advantages

A principal advantage of the invention is that the processing of data into and out of the random access memory need not be changed even in the presence of time base errors, thus simplifying its implementation. Moreover, the invention requires less hardware, since it does not require a spare memory and does not require an intelligent controller or multiplexer able to sense the occurrence of time base errors and route incoming video data to the spare memory in response to such errors. Thus, the invention saves significant hardware costs. Finally, the invention can accomodate relatively high video data rates irrespective of the limited data rate capabilities of the individual memories comprising the time division multiplex multi-port memory. It thus achieves what heretofore was not thought possible, namely time division multiplexing, using a multi-port memory, in a manner impervious to time base errors without requiring any spare memory or spare multiplexing capability.

DESCRIPTION OF THE DRAWINGS

The invention may be understood by reference to the accompanying drawings of which:

FIGS. 5(A and B) is a simplified block diagram illustrating the partitioning of each of the individual memories illustrated in FIG. 4;

FIGS. 9A through 9I are contemporaneous timing diagrams illustrating the clock signals controlling the loading of data in the system of FIG. 8; and FIGS. 10A through 10F are contemporaneous timing diagrams illustrating the clock signals controlling the unloading of video data in the system of FIG. 8.

DETAILED DESCRIPTION

Prior Art

Figure 1:
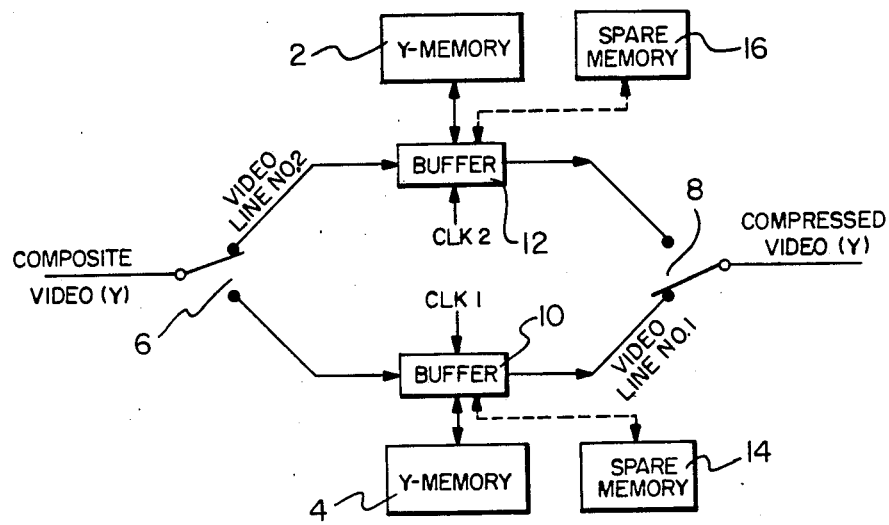
FIG. 1 is a simplified diagram illustrating time base expansion and compression for time division multiplexing in accordance with the prior art.

Referring to FIG. 1, time base compression and expansion for color video time division multiplexing, in accordance with the prior art, requires two memories 2, 4 to process each color component (for example, the luminance, or Y, component of the video signal). An incoming luminance signal is loaded into one of the two memories 2, 4 through a switch 6, while a compressed luminance signal is unloaded from another one of the two memories 2, 4 through a switch 8. In the example of FIG. 1, horizontal video line 1, previously loaded into the memory 4 is unloaded through a buffer 10 under control of a first clock signal, CLK 1, while video line 2 is loaded under control of a second clock signal, CLK 2, through buffer 12 into the Y memory 2. The frequency difference between the two clock signals CLK 1 and CLK 2 represents the time base compression ratio of the system of FIG. 1. The foregoing technique is commonly referred to as double buffering.

Double buffering is required because the memories 2, 4, which typically comprise random access memory integrated circuits, can either load or unload data at any one particular time from any one particular address, but cannot load and unload simultaneously.

The disadvantage of the double buffering technique of FIG. 1 is that, for example, if a time base error causes the next video line (video line 3) to arrive before video line 1 has been completely unloaded from memory 4, a conflict arises between the requirements to finish unloading video line 1 and to commence loading video line 3 in memory 4. Typically, a portion of video line 3 will be lost. Since this is an unacceptable result, spare memories 14, 16 must be added and the buffers 10, 12 endowed with the abililty to appropriately route video data to and from the spare memories 14, 16, respectively, whenever a time base error occurs. Unfortunately, the additional capability of the buffers 10, 12 to respond to time base errors and to use the spare memories 14, 16 represents added complexity and cost, a significant disadvantage.

GENERAL CONCEPT OF THE INVENTION

Figure 2:
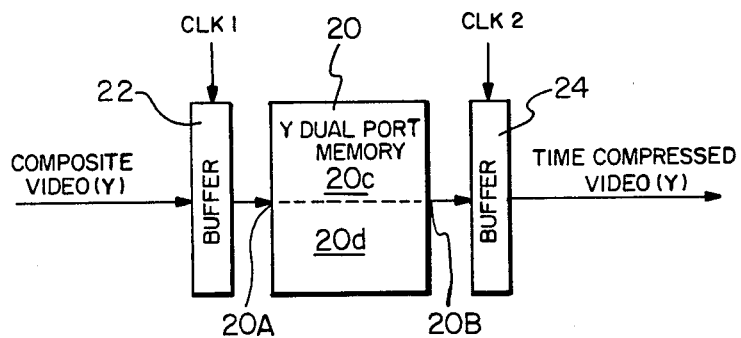
FIG. 2 is a simplified diagram illustrating time base compression of one of three video color components for time division multiplexing in accordance with the present invention.

The foregoing problems are overcome in accordance with an aspect of the invention illustrated in FIG. 2. A dual-port random access memory 20 provides time base compression, or expansion, for time division multiplexing, or demultiplexing, of a video signal. FIG. 2 illustrates the processing of one of three color components of a video signal, in this example the luminance, or Y, component.

In the multiplexing mode, each horizontal video line of a composite video signal is loaded into the memory 20 through a memory port 20A by a buffer 22 while, simultaneously, the previous horizontal video line is unloaded by a second buffer 24 from the memory 20 through a memory port 20B. During one video line, the buffer 22 loads data into one portion 20C of the memory 20 through the memory port 20A, while the buffer 24 unloads data from another portion 20D of the memory 20 through the memory port 20B. During the next video line, the roles of the two memory portions are reversed, data being unloaded from the memory portion 20C and data being loaded into the memory portion 20D. The buffer 22 loads video data into the memory 20 in synchronism with a first clock signal, CLK 1, while the buffer 24 unloads video data in synchronism with a second time-compressed clock signal, CLK 2.

In one example, incoming horizontal video line number 1 is loaded into the memory portion 20C. Then, incoming horizontal video line number 2 is loaded into the memory portion 20D while, simultaneously, video line 1 is unloaded from the memory portion 20C. If a time base error causes incoming video line 2 to conclude early and incoming video line 3 to arrive early, i.e., before all of video line number 1 has been unloaded from memory portion 20C, no data will be lost and no conflict arises between read and write memory operations, because line 3 is simply loaded into a part of memory portion 20C previously vacated by an already-unloaded portion of video line 1.

Figure 3:
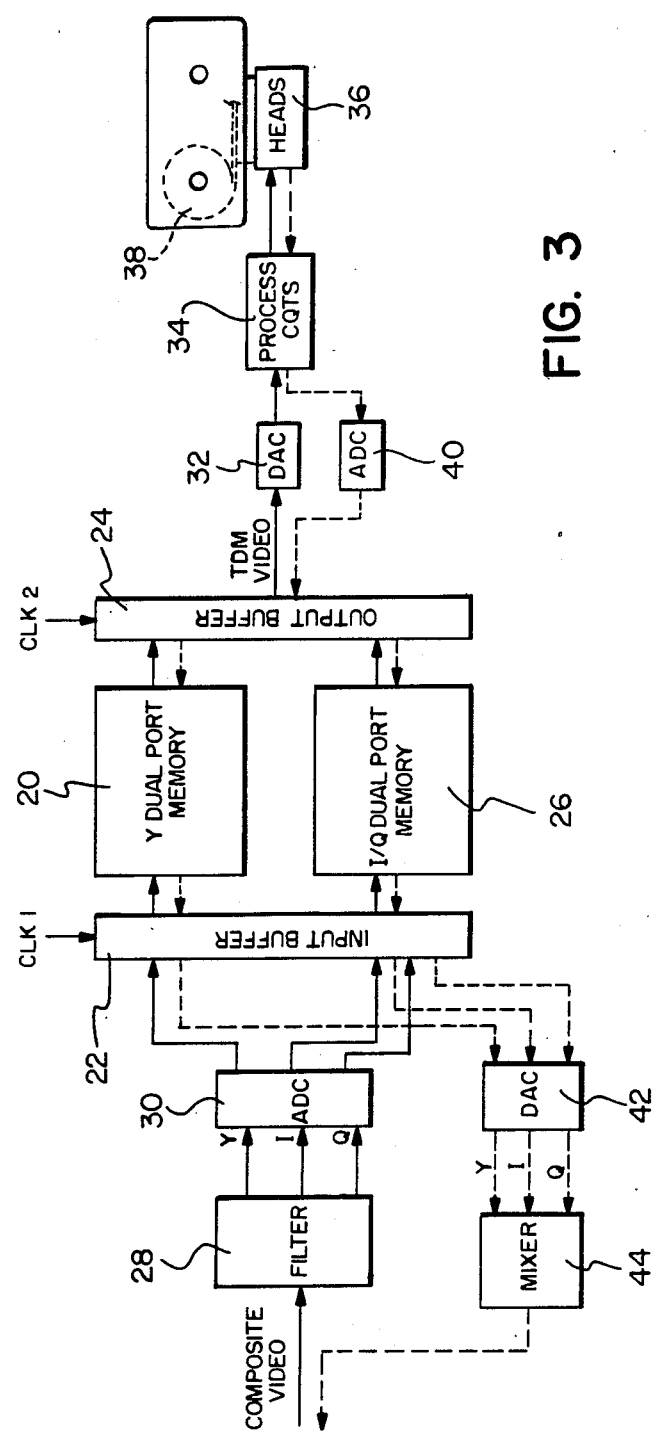
FIG. 3 is a simplified block diagram illustrating a time division mulitplex video recorder in accordance with the invention.

FIG. 3 illustrates a video record and playback system in accordance with the present invention. It includes the Y dual-port memory 20 and an I/Q dual-port memory 26. Each horizontal line of an incoming composite video signal is separated by a filter 28 into a luminance component Y and two chrominance components I and Q. The separated Y, I and Q components are converted to digital data by an analog-to-digital converter 30. The buffer 22 loads the Y video data into the Y dual-port memory 20 and loads the I and Q video data into the I/Q dual-port memory 26 in synchronism with the first clock signal CLK 1. The buffer 24 unloads each horizontal line of Y, I and Q data sequentially from the memories 20 and 26 in synchronism with the time-compressed clock signal CLK 2 into a digital-to-analog converter 32, where it is reconverted to Y, I and Q analog signals. The Y, I and Q signals are sequentially processed in process circuits 34 and recorded through record heads 36 onto video tape 38.

The system of FIG. 3 may be used as a demultiplexer to construct a composite video signal from a previously recorded time division multiplexed video signal by operating in reverse, as indicated by the dash lines of FIG. 3. Thus, a video signal previously recorded on the video tape 38 may be played back through the heads 36, processed by the process circuits 34 and converted to digital data by a analog-to-digital converter 40. The converted Y, I and Q data is loaded by the buffer 24 into the Y and I/Q dual-port memories 20, 26 in order of receipt. Each horizontal line of Y, I and Q data is then unloaded simultaneously from the memories 20, 26 through the buffer 22 and converted to Y, I and Q analog signals in a digital-to-analog converter 42. The Y, I and Q signals are then mixed in a mixer 44 to produce a composite video signal.

The sampling rates of the I and Q chrominance components are typically on the order of one-fourth that of the luminance component Y, so that both I and Q component horizontal lines may be loaded together into the dual-port memory 26.

One problem with the embodiment of FIG. 3 is that currently available dual-port random access memories are not capable of handling the high sampling (byte) frequency requirements of video processing. For example, if the analog-to-digital converter 30 generates about 1000 digital samples or bytes, (each byte comprising one 8-bit word) for each horizontal video line, the byte frequency of the time division multiplex video signal received by the digital-to-analog converter 32 is on the order of 18 MHz. Typically, a dual-port random access memory integrated circuit of the kind currently available is capable of data rates on the order of no more than 11 or 12 MHz, which is inadequate for high resolution video signal processing, a significant problem.

Sub-Memory Word Interleaving

Figure 4:
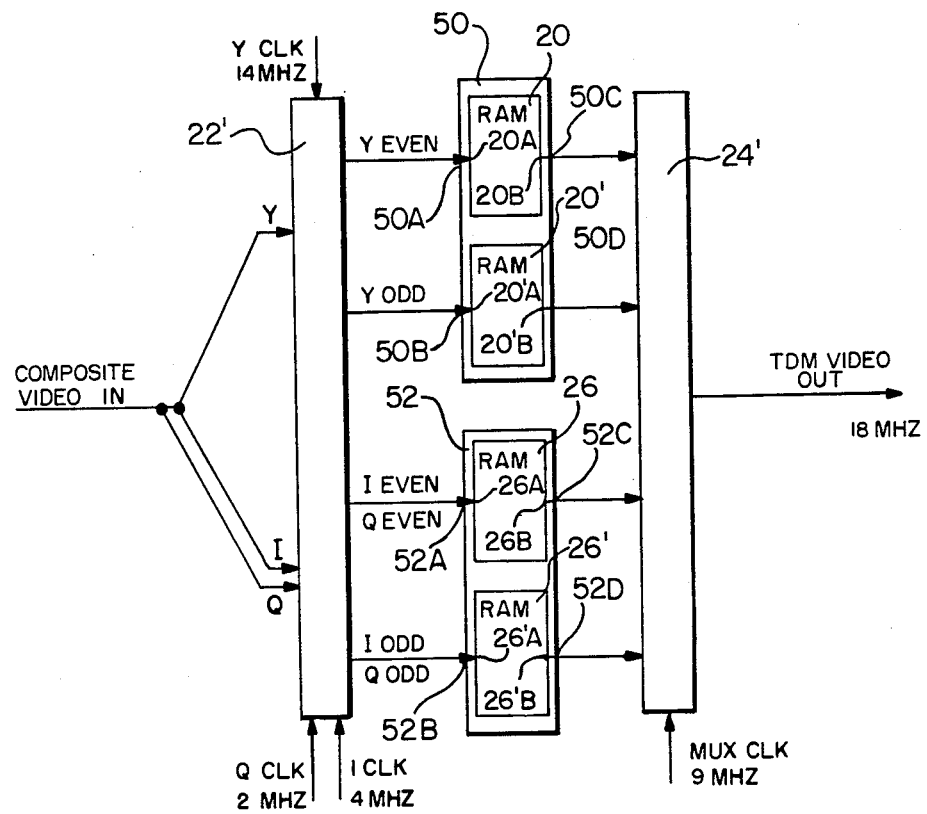
FIG. 4 is a simplified block diagram illustrating the presently preferred embodiment of the invention.

The foregoing problem is solved in the embodiment of the invention illustrated in FIG. 4. Two four-part memories 50, 52 receive incoming composite video data from a word de-interleave buffer 22'. The Y four-port memory 50 receives alternate 8-bit words of the incoming luminance signal at one of its input ports 50A (the even luminance words, $Y_{even}$, for example) and receives the remaining luminance words at its other input port 50B (the odd luminance words, $Y_{odd}$, in this example). The I/Q four port memory 52 receives the even 8-bit words of the I and Q signals, $I_{even}$, $Q_{even}$, in alternate succession, at one of its input ports 50A. Simultaneously, it receives the odd 8-bit words of the I and Q signals $I_{odd}$, $Q_{odd}$, in alaternate succession, at its other input port 52B. For this purpose, the word de-interleave buffer 22' de-interleaves each of the three incoming digital video signals (Y, I and Q) into two signals comprising, respectively, odd and even 8-bit words, to generate a total of 6 digital signals $Y_{even}$, $Y_{odd}$, $I_{even}$, $I_{odd}$, $Q_{even}$ and $Q_{odd}$. By splitting each of the Y, I and Q digital signals into odd and even digital signals and storing them separately in memory through different memory ports, the access speed, or byte frequency at any one memory port is reduced by a factor of two without reducing the overall system byte frequency.

The data is unloaded from each of the memories 50, 52 at their respective output ports 50C, 50D and 52C, 52D. The odd and even Y data words are unloaded from the four-port memory 50 simultaneously, and are re-interleaved by the interleave buffer 24' into a single train of data words comprising the luminance signal. After one horizontal video line of luminance signal is unloaded, the corresponding horizontal line of I words is unloaded from the four-port memory 52, odd and even I words being unloaded simultaneously from the memory ports 52C, 52D and being interleaved into a single train of data words by the interleave buffer 24'. Next, the corresponding horizontal line of Q words is unloaded from the four port memory 52, odd and even Q words being unloaded from the memory ports 52C, 52D, respectively and being interleaved into a single train of data words by the interleave buffer 24'. The result is a time division mulitplex (TDM) output video signal having a byte frequency on the order of 18 MHz.

Preferably, each of the four-port memories 50, 52 comprises two dual-port random access memory integrated circuits or chips. For example, the four port memory 50 may comprise two identical dual-port random access memory chips, 20 and 20', while the four port memory 52 may comprise two identical dual-port random access memory chips 26 and 26'. Each of the memory chips 20, 20', 26, and 26' has two independent memory ports 20A, 20B, 20'A, 20'B, 26A, 26B, 26'A, and 26'B, respectively. In this example, the even Y words are stored in the memory chip 20, the odd Y words are stored in the memory chip 20', the even I and Q words are stored in the memory chip 26 and the odd I and Q words are stored in the memory chip 26'. This structure has the advantage that the highest byte frequency on each individual chip is about 9 MHz, half the interleaved byte rate (18 MHz) of the buffer 24' and well within the capability of the chip. Thus, the apparatus of the invention operates well above the byte frequencies required for video signal processing even though the individual memory chips comprised within the apparatus operate well below such frequencies. Each of the dual-port memory chips 20, 20' and 26, 26' may be thought of as a dual port sub-memory comprised within a respective one of the four-port memories 50, 52.

Partitioning of Sub-Memories

Operation of the embodiment of FIG. 4 is shown in FIG. 5. FIG. 5 illustrates the mulitplexing mode in which data flows from left to right in the drawing, although it should be understood the invention is equally useful in the demultiplexing mode in which data flows from right to left. In the example of FIG. 5, all of the data comprising horizontal video line number 1 was loaded previously into respective portions of the sub-memories 20, 20', 26, and 26' and is now being unloaded therefrom to generate the first horizontal line of a time division muliplexed video signal 54. Simultaneously, horizontal line number 2 of an incoming composite video signal 56 is being loaded into other portions of the sub-memories 20, 20', 26, and 26'.

Y Memory Partitioning

The Y memory 50 comprises an odd Y sub-memory 20 and an even Y sub-memory 20' (as described previously in connection with FIG. 4). The Y sub-memories 20, 20' are partitioned into address blocks 20C, 20'C, respectively, extending from address 0 to address 376, and address blocks 20D, 20'D, respectively, extending from address 512 to address 888, in the manner indicated in FIG. 5. The address blocks 20C, 20D, 20'C, 20'D are accessed simultaneously through different respective ones of the memory ports 20A, 20B, 20'A, 20'B. The odd and even words of horizontal video line 1 of the luminance signal (Y) are unloaded from the address blocks 20C, 20'C, respectively to form the luminance portion of the time division multiplexed video signal 54. Simultaneously, the odd and even luminance words of horizontal line 2 of the incoming composite video signal 56 are loaded into the address blocks 20D, 20'D, respectively.

After all of the Y words of horizontal video line 1 have been unloaded from the Y address blocks 20C, 20'C, the Y words of horizontal video line 2 are unloaded from the Y address blocks 20D, 20'D. Thus, the loading and unloading operations in the Y address blocks 20C, 20D and 20'C, 20'D are reversed once every horizontal line scan interval.

I/Q Memory Partitioning

The I/Q odd and even sub-memories 26, 26' are partitioned into Q address sub-blocks 26C', 26C"; 26'C', 26'C" and I address sub-blocks 26D', 26D"; 26'D', 26'D", respectively in the manner indicated in FIG. 5.

The Q address sub-blocks extend within the respective sub-memories from address 0 to address 053 (sub-blocks 26C', 26'C') and from address 256 to address 310 (sub-blocks 26C", 26'C"). The I address sub-blocks extend within the respective sub-memories from address 512 to address 620 (sub-blocks 26D', 26'D') and from address 768 to address 876 (sub-blocks 26D", 26'D"). The address sub-blocks 26C', 26D', 26'C', 26'D' store the I and Q words of horizontal video line 1. The address sub-blocks 26C", 26D", 26'C", 26'D" store the I and Q words of horizontal video line 2.

The first horizontal video line of Q words of the TDM signal 54 is generated by unloading the odd and even Q words from the Q address sub-blocks 26C' and 26'C', respectively. Then the first horizontal line of I words of the TDM signal 54 is generated by unloading the odd and even I words from the I address sub-blocks 26D' and 26'D', respectively.

At about the same time, the odd and even I words of horizontal video line 2 of the incoming composite video signal 56 are loaded into the I address sub-blocks 26D" and 26'D", respectively, while the odd and even Q words of horizontal line 2 are loaded into the Q address sub-blocks 26C" and 26'C", respectively.

After all of the I and Q words of horizontal video line 1 have been unloaded from the I and Q address sub-blocks 26C', 26'C'; 26D', 26'D', the I and Q words of horizontal video line 2 are unloaded from the I and Q address sub-blocks 26C", 26'C"; 26D", 26'D". Thus, the loading and unloading operations in the I and Q address sub-blocks are reversed once every horizontal line scan interval.

Memory Load Timing

Figure 6A:
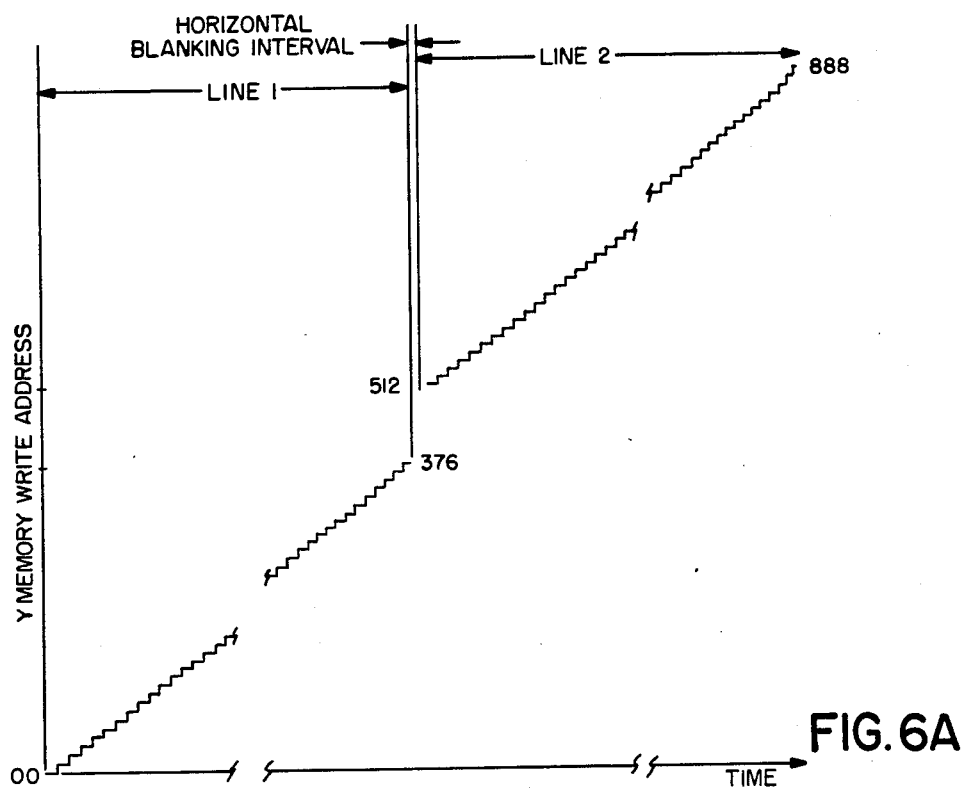
FIGS. 6A and 6B are contemporaneous timing diagrams illustrating the memory write addressing sequence in the embodiment of FIG. 4.

Memory load operations in the apparatus of FIG. 5 are illustrated in the contemporaneous timing diagrams of FIG. 6. FIG. 6A illustrates, as a function of time, the Y memory address specifying the memory location where the incoming odd and even Y words are loaded into the odd and even Y sub-memories 20, 20', respectively. In the example of FIG. 6, the Y data of horizontal video line number 1 is loaded into the odd and even Y memories 20, 20' starting at address 0 and ending at address 376 (address blocks 20C and 20"C). Then, the Y data of horizontal video line number 2 is loaded starting at address 512 and ending at address 888 (address blocks 20D and 20'D).

Figure 6B:
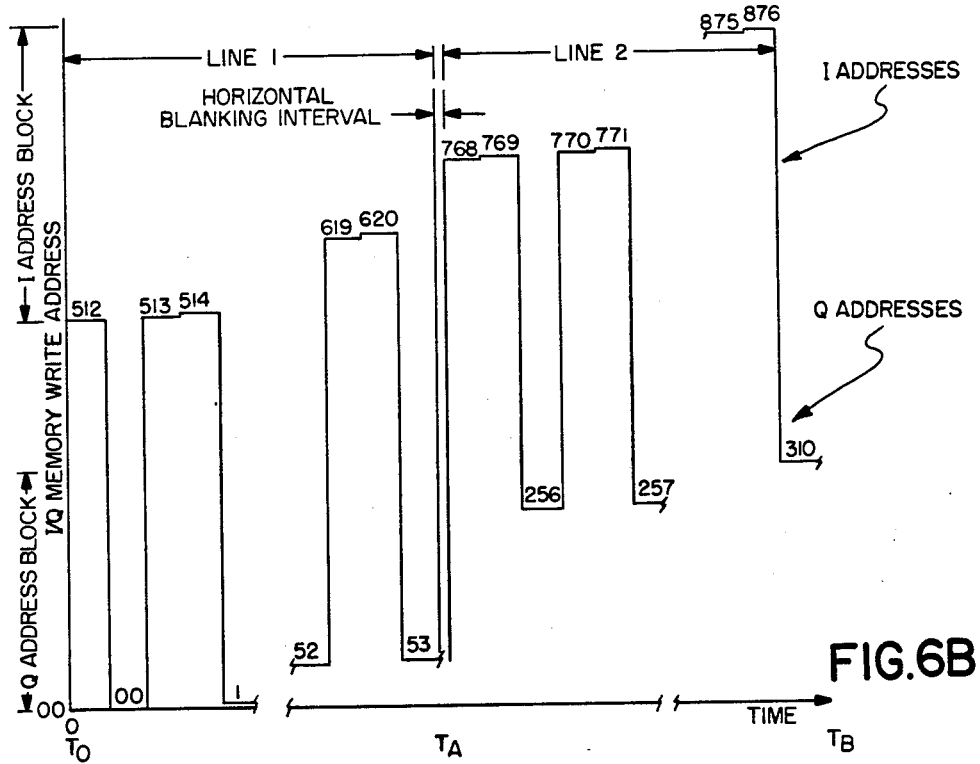

Referring to FIG. 6B, the incoming odd and even I words of video line number 1 are loaded into the odd and even I/Q memories 26, 26' beginning at address 512 and concluding at address 620 (I address sub-blocks 26D' and 26'D'). As illustrated in FIG. 6B, loading of any two I words is followed by the loading of one Q word. The odd and even Q words of horizontal line number 1 are loaded into the odd and even I/Q memories 26, 26' beginning at address 0 and ending at address 53 (Q address sub-blocks 26C', 26'C'). Loading of the I and Q words of horizontal line 2 is performed similarly, the I words being loaded starting at address 768 and concluding at address 876 (I address sub-blocks 26D" and 26'D"), and the Q words being loaded starting at address 256 and concluding at address 310 (Q address sub-blocks 26C" and 26'C").

Memory Unload Timing

Figure 7:
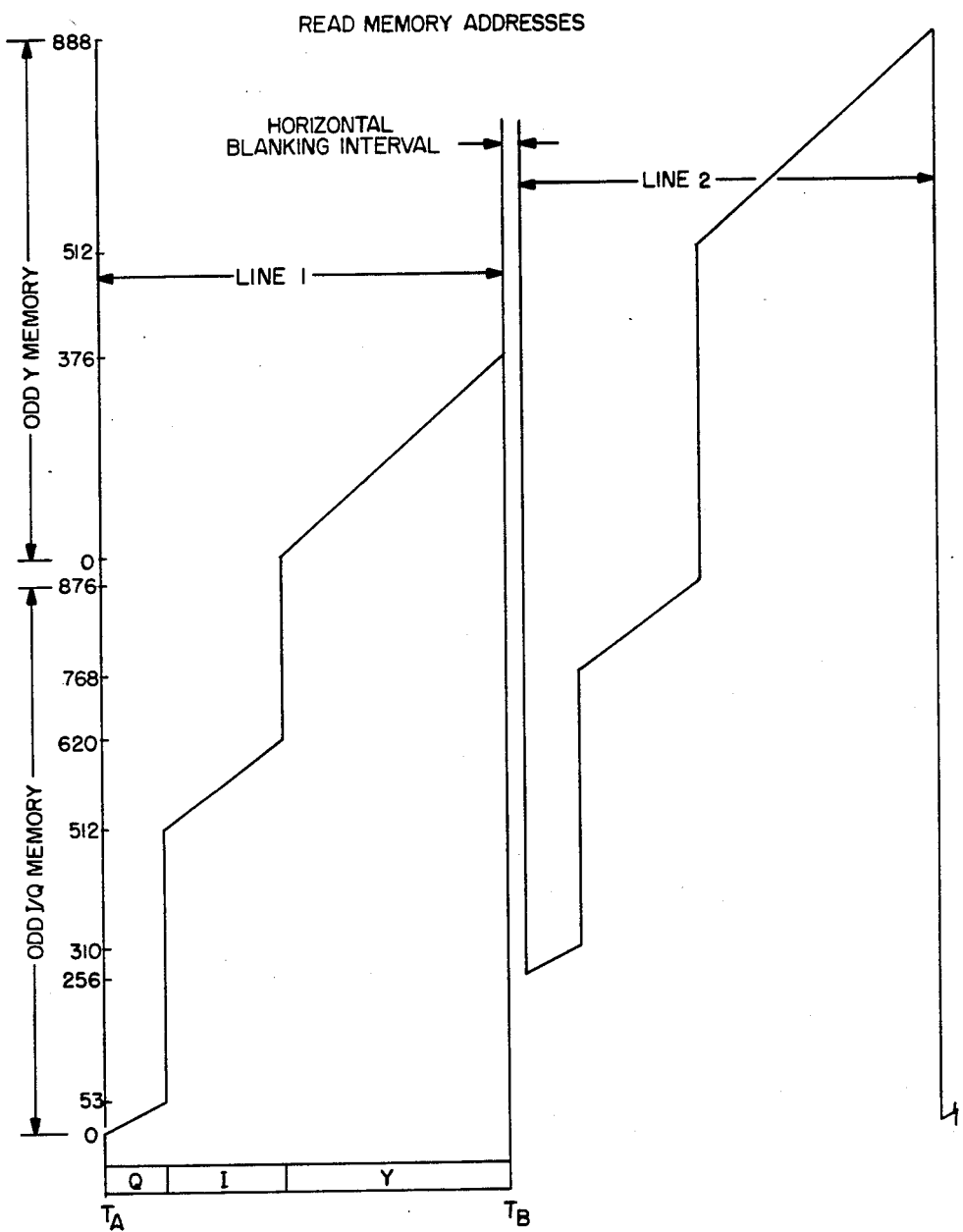
FIG. 7 is a timing diagram illustrating the memory read addressing sequence in the embodiment of FIG. 4.

Simultaneously with the loading of horizontal video line number 2 (illustrated in FIG. 6 between times $T_A$ and $T_B$) horizontal video line number 1 is unloaded (as illustrated in FIG. 7 between times $T_A$ and $T_B$). It will be remembered that the loading of video line 1 and unloading of video line 2 are the simultaneous events depicted in FIG. 5. Referring to FIG. 7, the Q words are unloaded from the odd and even Q address sub-blocks 26C', 26'C' beginning at address 0 and concluding at address 53. Then, the I words are unloaded from the odd and even I address sub-blocks 26D' and 26'D' beginning at address 512 and ending at address 620. Finally, the Y words of horizontal line 1 are unloaded from the odd and even Y address blocks 20C and 20'C beginning at address 0 and ending at address 376.

Preferred Logic Design

Figure 8A:
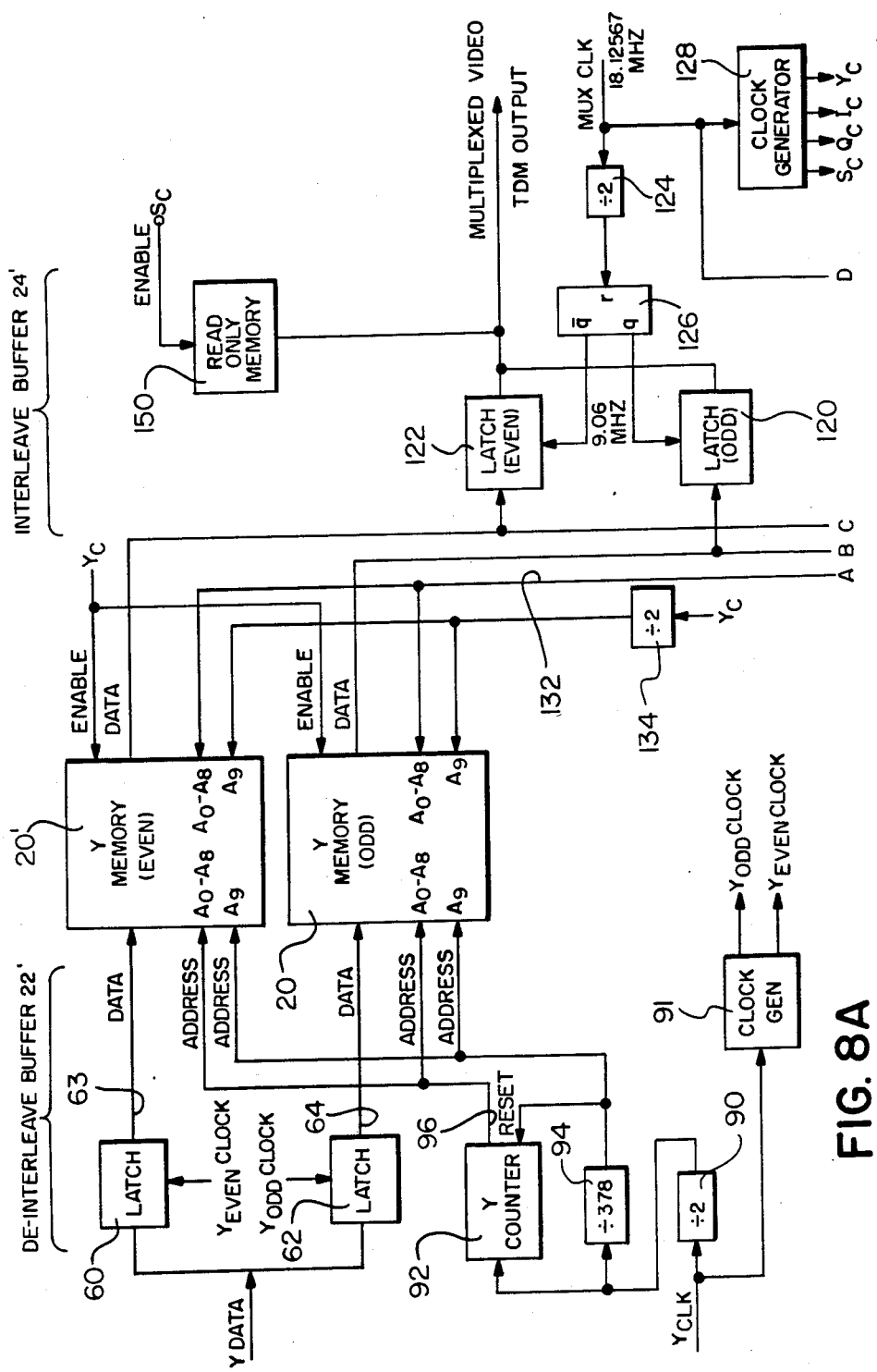
FIGS. 8(A and B) is an exemplary logic diagram of the embodiment of FIG. 4.
Figure 8B:
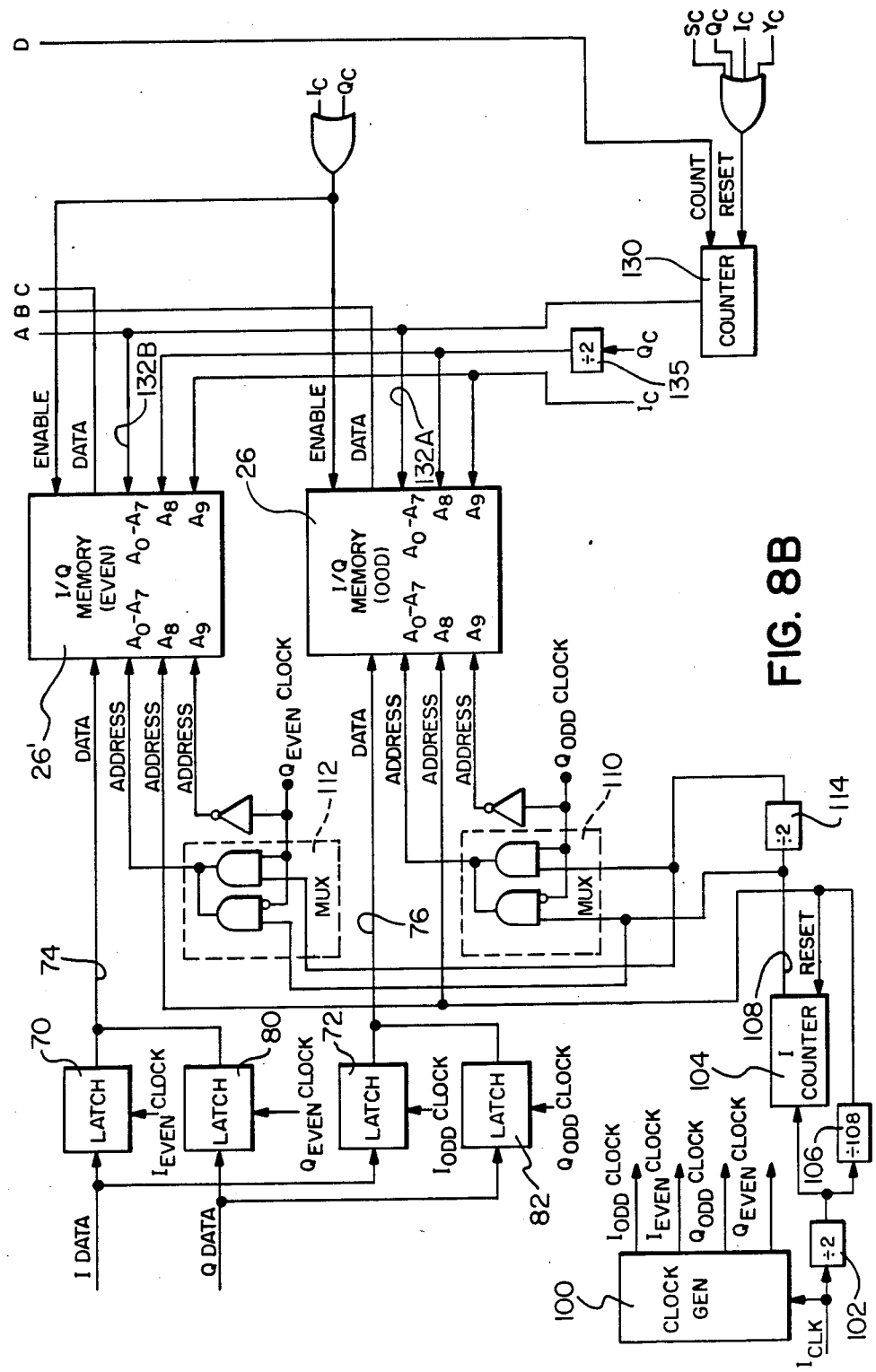

The presently preferred logic design of the embodiment of FIG. 4 is illustrated in FIG. 8. Each of the Y and I/Q odd and even sub-memories 20, 20' 26, 26' comprises a dual-port random access memory integrated circuit such as the IDT 7130 sold by Integrated Devices Technology, Inc. 3236 Scott Boulevard, Santa Clara, Calif.

Loading Composite Video Data (1) Input Latches

Incoming Y data is gained through odd and even Y latches 60, 62 in synchronism with $Y_{odd}$ and $Y_{even}$ clock signals (FIGS. 9D, 9E) into the odd and even Y sub-memories 20, 20'. 8-bit data busses 63, 64 connect the even and odd Y latches 60, 62 to the even and odd Y sub-memories 20', 20, respectively. The incoming I data is gated through even and odd I latches 70, 72 in synchronism with $I_{even}$ and $I_{odd}$ clock signals (FIGS. 9G and 9F) through 8-bit data busses 74, 76 to the even and odd I/Q memories 26', 26, respectively.

The incoming Q data is gained by even and odd Q latches 80, 82 in synchronism with $Q_{even}$ and $Q_{odd}$ clock signals (FIGS. 9I and 9H) through the 8-bit data busses 74, 76 to the even and odd I/Q sub-memories 26', 26, respectively.

(2) Load Y Addressing

Y data is loaded into the even and odd Y sub-memories 20', 20 at memory addresses generated in synchronism with a $Y_{clk}$ signal (FIG. 9A). The $Y_{clk}$ signal is applied through a divide-by-two device 90 to a Y counter 92, to a divide-by-378 device 94 and to a $Y_{clk}$ generator 91 which generates the $Y_{odd}$ and $Y_{even}$ clock signals of FIGS. 9D and 9E, respectively. The output of the Y counter 92 is applied through an 8-bit bus 96 to the nine least significant address bits $A_0$ through $A_8$ of the odd and even Y sub-memories 20, 20'. The output of the divide-by-378 device 94 is applied as a reset signal to the Y counter 92 and is also applied to the most significant address bit $A_9$ of the odd and even Y sub-memories 20, 20'.

(3) Load I and Q Addressing

The I and Q data is loaded into the I/Q sub-memories 26, 26' at memory addresses generated in synchronism with an $I_{clk}$ signal (FIG. 9B). The $I_{clk}$ signal is applied to a clock generator 100, which generates $I_{odd}$, $I_{even}$, $Q_{odd}$, $Q_{even}$ clock signals (FIGS. 9F through 9I, respectively). The $I_{clk}$ signal is also applied through a divide-by-two device 102 to an I counter 104 and to a divide-by-108 device 106. The output of the I counter 104 is applied through an 8-bit bus 108 to multiplexers 110 and 112 and to an 8-bit divide-by-two device 114. The output of the 8-bit divide-by-two device 114 is connected to the multiplexers 110 and 112, as shown in FIG. 8. The multiplexer 110 applies either the undivided output of the I counter 104 or the output of the 8-bit divide-by-two device 114 to the eight least significant address bits $A_0$ through $A_7$ of the odd I/Q sub-memory 26, depending upon whether the $Q_{odd}$ clock signal (FIG. 9H) is low or high, respectively. Similarly, the multiplexer 112 applies either the undivided output of the I counter 104 or the output of the divide-by-two device 114 to the eight least significant address bits $A_0$ through $A_7$ of the even I/Q sub-memory 26', depending upon whether the $Q_{even}$ clock signal (FIG. 9I) is low or high, respectively.

The $Q_{odd}$ and $Q_{even}$ clock signals are inverted and applied to the most significant address bit $A_9$ of the odd and even I/Q memories 26, 26', respectively.

The divide-by-108 device 106 produces an output pulse once every horizontal line which provides the transition at the 8th binary address bit $A_8$ ($=2^8$) between the line 1 and line 2 I/Q sub-address blocks. For example, referring to FIG. 6B, slightly after time $T_A$ the Q address is reset to zero and then is increased by a quantum of $2^8$ (i.e., 256). It is this quantum which separates the line 1 address blocks from the line 2 address blocks.

The $Q_{odd}$ and $Q_{even}$ clock signals, applied to the address bit $A_9$ of the odd and even I/Q memories 26, 26', respectively, provide the transition between I and Q sub-address blocks. For example, at time $T_0$ of FIG. 6B, the I data word is loaded into address 512. A transition is then made to address 0 in order to load the corresponding Q word. The tranisition is equal to $2^9$ (i.e. 512), and this same transition is made every two I words in order to load one Q word, as illustrated in FIG. 6B.

(4) Load Timing

The clock signals of FIGS. 9D through 9I cause the Y, I and Q odd and even latches 60, 62, 70, 72, 80, 82 to gate odd and even Y, I and Q words to the odd and even Y sub-memories and the odd and even I/Q sub-memories, respectively. Thus, during the time interval $T_Y$ of FIG. 9D, an odd Y word is loaded into the odd Y sub-memory 20, during the $T_I$ time interval of FIG. 9F a corresponding odd I word is loaded into the odd I/Q sub-memory 26 and during the time interval $T_0$ of FIG. 9H the corresponding odd Q word is loaded into the odd I/Q sub-memory 26'. The cycle is repeated for even words in a similar manner.

In the preferred embodiment of the invention, every horizontal line of the luminance signal is sampled (by the ADC 30 of FIG. 4) 756 times to generate 756 8-bit Y words during an active time interval of 53.65 microseconds at a sampling rate of 14.0979 MHz. Every horizontal line of the I chrominance signal is sampled 216 times to generate 216 8-bit I words during the active time interval of 53.625 microseconds at a 4.02797 MHz sampling rate. Every horizontal line of the Q chrominance signal is sampled 108 times to generate 108 8-bit Q words during each active line interval of 53.65 microseconds at a sampling rate of 2.01399 MHz.

Unloading Multiplexed Video Data (1) Output Latches

Referring to FIG. 8, all data unloaded from the odd and even Y and I/Q memories 20, 26 and 20', 26' is gated through odd and even output latches 120, 122, respectively, in synchronism with a time-compressed clock signal MUX. The odd and even latches 120, 122 gate odd and even video words respectively during odd and even half-cycles of the MUX clock. For this purpose, the MUX clock signal is applied through a divide-by-two device 124 to a flip-flop 126 whose complementary q and q outputs are applied to the clock inputs of the odd and even output latches 120, 122, respectively.

Addressing of the output ports of the sub-memories 20, 20', 26, 26'is controlled by clock signals $Q_c$, $I_c$, $Y_c$ (FIGS. 10B, 10C, 10D, respectively) produced by a clock generator 128 in synchronism with the MUX clock signal. Addressing is also controlled by the output of a counter 130 counting in synchronism with the MUX clock signal. The counter 130 is reset by each of the clock signals $Y_c$, $I_c$, $Q_c$ and by another clock signal $S_c$ (FIG. 10A) produced by the clock generator 128.

(2) Unload Y addressing

Addressing the data to be unloaded from the Y odd and even memories 20, 20' is controlled by the $Y_c$ clock signal (FIG. 10d). The $Y_c$ clock signal is applied to the unload enable terminals of the Y memories 20, 20'. The nine least significant output address bits $A_0$ through $A_8$ of the odd and even Y sub-memories 20, 20' are controlled by nine output bits of the counter 130 through a 9-bit address bus 132. The $Y_c$ clock signal is also applied through a divide-by-two device 134 to the most significant address bit $A_9$ of the odd and even Y sub-memories 20, 20'. This causes the memory unload address to change by a quantum amount $2^9$ (i.e., 512) every other horizontal video line, so that it shifts between the "line 1" and "line 2" address blocks 20C, 20'C and 20D, 20'D of the odd and even Y memories 20, 20', respectively, every horizontal video line.

(3) Unload I and Q Addressing

Addressing the data to be unloaded from the odd and even I/Q memories 26, 26' is controlled by the clock signals $Q_c$, $I_c$, and $Q_c\pm 2$ (FIGS. 10B, 10C and 10E, respectively). The $I_c$ and $Q_c$ clock signals are both applied to the unload enable terminals of the I/Q memories 26, 26'. The eight least significant output bits of the 9-bit counter 130 control the eight least significant output address bits $A_0$ through $A_7$ of the odd and even I/Q memories 26, 26' through 8-bit address busses 132A, 132B. The next most significant output address bit, $A_8$, is controlled by the $Q_c$ clock signal applied through a divide-by-two device 135. At the beginning of eery other horizontal line, the I/Q memory output address is shifted up by $2^8$ (i.e. 256) by the $Q_c$ clock signal, corresponding to the displacement between corresponding address blocks storing different horizontal lines (discussed previously in connection with FIG. 5). The output address of the I/Q odd and even memories 26, 26' is shifted once every horizontal video line by $2^9$ (i.e. 512) by the $I_c$ clock signal applied to the most significant output address bit $A_9$ of the sub-memories 26, 26'. This corresponds to the displacement between respective Q and I address sub-blocks storing a given horizontal line (as discussed previously in connection with FIG. 6b).

(4) Unload Timing

Referring to FIG. 10, during the horizontal blanking interval at the beginning of each horizontal line, the $S_c$ clock signal has a pulse duration equal to the first 54 cycles of the MUX clock signal. The $S_c$ clock signal is applied to a read only memory 150 whose output comprises, in succession, a horizontal sync pulse, a luminance black pulse and a chrominance black pulse, as illustrated in FIG. 10f. The 54-cycle pulse duration of $S_c$ defines the synchronization and clamping interval. The $Q_c$ clock signal becomes high upon the 54th cycle of the MUX clock signal and signifies the beginning of the active video interval, corresponding to time $T_A$ of FIG. 7. The $Q_c$ clock signal becomes low at cycle 162 of the MUX clock signal. At cycle 171, the $I_c$ clock signal becomes high and resumes its low logic state at cycle 387. The $Y_c$ clock signal becomes high at 396 and returns to a low logic state at cycle 1152 of the MUX clock signal. The process is then repeated, as illustrated in FIG. 10 so as to unload the memories in the sequence described previously in connection with FIG. 7.

While the apparatus of FIG. 8 has been described in a multiplexing mode in which data flows from left to right in the drawing of FIG. 8, the apparatus is equally useful in a demultiplexing mode in which data flows from right to left in the drawing of FIG. 8.

While the invention has been described in detail with particular reference to preferred embodiments thereof, it will be understood that variations and modifications can be made within the spirit and scope of the invention.

What is claimed is:

1. A video time division multiplex signal processing system for either multiplexing or demultiplexing a color video signal, said color video signal being characterized by plural color components occurring in plural successive odd and even video lines corresponding to odd and even video line scan periods, each of said lines comprising a succession of odd and even video words, said system comprising:

(a) memory means having plural memories, each of said memories having a first port and a second port;

(b) input/output means, connected to the first port of each of said memories, said input/output means comprising:

i. first addressing means for addressing a first set of locations in a first group of said memories during odd ones of said video line scan periods, wherein:

said first group of memories comprises as much as one memory for each of said color components, said one memory being adapted to store video data of the corresponding color component, said first set of memory locations corresponding to said odd numbered video lines, ii. second addressing means for addressing a second set of locations in a second group of said memories during even ones of said video line scan periods, wherein:

said second group of memories comprises as much as one memory for each of said color components, said one memory being adapted to store video data of the corresponding color component, said second set of memory locations corresponding to said even video lines;

(c) output/input means connected to the second port of each of said memories, comprising:

i. third addressing means for addressing said first set of memory locations in each of the memories of said first group sequentially in corresponding plural successive intervals during said even video line scan periods at least nearly simultaneously with said second addressing means addressing said second set of memory locations, and ii. fourth addressing means for addressing said second set of memory locations in each of the memories of said second group sequentially in corresponding plural successive intervals during said odd video line scan periods at least nearly simultaneously with said first addressing means addressing said first set of memory locations, wherein said input/output means and said output/input means operate at different data rates for time compression or expansion, whereby said odd and even video lines of each of said components are loaded into different ones of said memories so as to avoid data conflicts between them.

2. The system of claim 1 wherein:

said input/output means loads said odd and even video lines into said memory means through said first memory ports during said odd and even video line scan periods, respectively; and said output/input means unloads said odd and even video lines from said memory means through said second memory ports during said even and odd video line scan periods, respectively, whereby said system performs time division multiplexing of said video signal.

3. The system of claim 1 wherein said input/output means unloads said even and odd video lines from said memory means through said first memory ports during said even and odd video line scan periods, respectively; and said output/input means loads said even and odd video lines into said memory means through said second memory ports during said odd and even video line scan periods, respectively, whereby said system performs time division demultiplexing of said video signal.

4. The system of claim 1 wherein:

said plural color components comprise three color components, namely Y, I and Q; and each of said first and second groups of memories comprises a Y memory comprising those of said first or second sets of memory locations, respectively, associated with said Y component, and an I/Q memory comprising those of said first or second memory locations, respectively, associated with said I and Q components.

5. The system of claim 1 wherein:

said first addressing means further addresses a third set of memory locations in said second group of memories during said odd scan periods and addresses a fourth set of memory locations in said first group of memories during said even scan periods;

said second addressing means further address said third set of memory locations during said even scan periods and addresses said fourth set of memory locations during said odd scan periods;

said system further comprising:

de-interleaving/interleaving means connected to the first memory port of each of said memories for de-interleaving said odd and even video words of each of said color components whenever data is being loaded or unloaded, respectively, through said first memory ports, interleaving/de-interleaving means connected to said second memory ports of each of said memories for interleaving or de-interleaving said odd and even video words of each of said color components whenever data is being unloaded or loaded, respectively, through said second memory ports, whereby to store said odd video words in said first and second sets of memory locations and to store said even video words in said third and fourth sets of memory locations.

6. The system of claim 5 wherein:

said plural color components comprise three color components, namely Y, I and Q; and each of said first and second groups of memories comprises:

an odd Y memory comprising those of said first and third sets of memory locations, respectively, associated with said Y component, an even Y memory comprising those of said second and fourth sets of memory locations, respectively, associated with said Y component, an odd I/Q memory comprising those of said first and third sets of memory locations, respectively, associated with said I and Q components, and an even I/Q memory comprising those of said second and fourth sets of memory locations, respectively, associated with said I and Q components.

7. The system of claim 6 wherein said odd and even I/Q memories each comprise a two-port random access memory integrated circuit partitionable into an I address block and a Q address block, each of said blocks being dedicated to store a corresponding set of video data associated with said I and Q components, respectively.

8. The system of claim 5 wherein each of said memories comprises a dual port random access memory integrated circuit characterized by a maximum data reading capacity.

9. The signal processing system of claim 2 further comprising:

a filter adapted to receive an analog composite video signal and to separate it into said color components;

an analog-to-digital converter connected between said filter and said input/output means, said converter adapted to convert each of said color components into a succession of said odd and even video words and apply them to said input/output means;

means for recording a video signal onto a magnetic medium; and a digital-to-analog converter connected between said output/input means and said recording means, whereby said color components are successively unloaded from said memory means by said second addressing means, converted by said converter to analog form and recorded by said recording means.

10. The signal processing system of claim 3 further comprising:

means for playing back a video signal previously recorded on a magnetic medium;

an analog-to-digital converter connected between said playback means and said output/input means;

an output node; and a digital-to-analog converter having its digital input connected to said input/output means and its analog output connected to said output node.

11. A video time division multiplex signal processing system for time division multiplexing a color video signal, said color video signal being characterized by plural color components occurring in plural successive odd and even video lines corresponding to odd and even video line scan periods, each of said lines comprising a succession of odd and even video words, said system comprising:

(a) memory means having plural memories, each of said memories having a first port and a second port;

(b) input/output means, connected to the first port of each of said memories, for loading the words of said odd and even video lines into said memory means through said first memory ports during said odd and even video line periods, respectively, said input/output means comprising:

i. first addressing means for addressing a first set of locations in a first group of said memories during odd ones of said video line scan periods, wherein:

said first group of memories comprises as much as one memory for each of said color components, said one memory being adapted to store video data of the corresponding color component, said first set of memory locations corresponding to said odd numbered video lines, ii. second addressing means for addressing a second set of locations in a second group of said memories during even ones of said video line scan periods, wherein:

said second group of memories comprises as much as one memory for each of said color components, said one memory being adapted to store video data of the correspoding color component, said second set of memory locations corresponding to said even lines;

(c) output/input means, connected to the second port of each of said memories, for unloading the words of said odd and even video lines from said memory means through said second memory ports during said even and odd video line scan periods, respectively, said output/input means comprising:

i. third addressing means for addressing said first set of memory locations in each of the memories of said first group sequentially in corresponding plural successive intervals during said even video line scan periods at least nearly simultaneously with said second addressing means addressing said second set of memory locations, and ii. Fourth addressing means for addressing said second set of memory locations in each of the memories of said second group sequentially in corresponding plural successive intervals during said odd video line scan periods at least nearly simultaneously with said first addressing means addressing said first set of memory locations, wherein said input/output means and said output/input means operate at different data rates for time compression, whereby said odd and even video lines of each of said components are loaded into different ones of said memories so as to avoid data conflicts between them.

12. The system of claim 11 wherein:

said plural color components comprise three color components, namely Y, I and Q; and each of said first and second groups of memories comprises a Y memory comprising those of said first or second sets of memory locations, respectively, associated with said Y component, and an I/Q memory comprising those of said first or second memory locations, respectively, associated with said I and Q components.

13. The system of claim 11 wherein:

said first addressing means further addresses a third set of memory locations in said second group of memories during said odd scan periods and addresses a fourth set of memory locations in said first group of memories during said even scan periods;

said second addressing means further address said third set of memory locations during said even scan periods and addresses said fourth set of memory locations during said odd scan periods;

said system further comprising:

de-interleaving/interleaving means connected to the first memory port of each of said memories for de-interleaving said odd and even video words of each of said color components whenever data is being loaded or unloaded, respectively, through said first memory ports, interleaving/de-interleaving means connected to said second memory ports of each of said memories for interleaving or de-interleaving said odd and even video words of each of said color components whenever data is being unloaded or loaded, respectively, through said second memory ports, whereby to store said odd video words in said first and second sets of memory locations and to store said even video words in said third and fourth sets of memory locations.

14. The system of claim 13 wherein:

said plural color components comprise three color components, namely Y, I and Q; and each of said first and second groups of memories comprises:

an odd Y memory comprising those of said first and third sets of memory locations, respectively, associated with said Y component, an even Y memory comprising those of said second and fourth sets of memory locations, respectively, associated with said Y component, an odd I/Q memory comprising those of said first and third sets of memory locations, respectively, associated with said I and Q components, and an even I/Q memory comprising those of said second and fourth sets of memory locations, respectively, associated with said I and Q components.

15. The system of claim 14 wherein said odd and even I/Q memories each comprise a two-port random access memory integrated circuit partitionable into an I address block and a Q address block, each of said blocks being dedicated to store a corresponding set of video data associated with said I and Q components, respectively.

16. the system of claim 13 wherein each of said memories comprises a dual port random access memory integrated circuit characterized by a maximum data reading capacity.

17. The signal processing system of claim 11 further comprising:

a filter adapted to receive an analog composite video signal and to separate it into said color components;

an analog-to-digital converter connected between said filter and said input/output means, said converter adapted to convert each of said color components into a succession of said odd and even video words and apply them to said input/output means;

means for recording a video signal onto a magnetic medium; and a digital-to-analog converter connected between said output/input means and said recording means, whereby said color components are successively unloaded from said memory means by said second addressing means, converted by said converter to analog form and recorded by said recording means.

18. A video time division multiplex signal processing system for time division demultiplexing a color video signal, said color video signal being characterized by plural color components occurring in plural successive odd and even video lines corresponding to odd and even video line scan periods, each of said lines comprising a succession of odd and even video words, said system comprising:

(a) memory means having plural memories, each of said memories having a first port and a second port;
(b) input/output means, connected to the first port of each of said memories, for unloading the words of said even and odd video lines from said memory means through said first memory ports during said even and odd video line scan periods, respectively, said input/output means comprising:
  i. first addressing means for addressing a first set of locations in a first group of said memories during odd ones of said video line scan periods, wherein:
    said first group of memories comprises as much as one memory for each of said color components, said one memory being adapted to store video data of the corresponding color component,
    said first set of memory locations corresponding to said odd numbered video lines,
  ii. second addressing means for addressing a second set of locations in a second group of said memories during even ones of said video line scan periods, wherein:
    said second group of memories comprises as much as one memory for each of said color components, said one memory being adapted to store video data of the corresponding color component,
    said second set of memory locations corresponding to said even video lines;
(c) output/input means connected to the second port of each of said memories, for loading the words of said even and odd video lines into said memory means through said second memory ports during said odd and even video line scan periods, respectively, said output/input means comprising:
  i. third addressing means for addressing said first set of memory locations in each of the memories of said first group sequentially in corresponding plural successive intervals during said even video line scan periods at least nearly simultaneously with said second addressing means addressing said second set of memory locations, and
  ii. fourth addressing means for addressing said second set of memory locations in each of the memories of said second group sequentially in corresponding plural successive intervals during said odd video line scan periods at least nearly simultaneously with said first addressing means addressing said first set of memory locations, wherein said input/output means and said output/input means operate at different data rates for time compression or expansion, whereby said odd and even video lines of each of said components are loaded into different ones of said memories so as to avoid data conflicts between them.

19. The system of claim 18 wherein:
said plural color components comprise three color components, namely Y, I and Q; and
each of said first and second groups of memories comprises a Y memory comprising those of said first or second sets of memory locations, respectively, associated with said Y component, an I/Q memory comprising those of said first or second memory locations, respectively, associated with said I and Q components.

20. The system of claim 18 wherein:
said first addressing means further addresses a third set of memory locations in said second group of memories during said odd scan periods and addresses a fourth set of memory locations in said first group of memories during said even scan periods;
said second addressing means further address said third set of memory locations during said even scan periods and addresses said fourth set of memory locations during said odd scan periods;
said system further comprising:
  de-interleaving/interleaving means connected to the first memory port of each of said memories for de-interleaving said odd and even video words of each of said color components whenever data is being loaded or unloaded, respectively, through said first memory ports,
  interleaving/de-interleaving means connected to said second memory ports of each of said memories for interleaving or de-interleaving said odd and even video words of each of said color components whenever data is being unloaded or loaded, respectively, through said second memory ports, whereby to store said odd video words in said first and second sets of memory locations and to store said even video words in said third and fourth sets of memory locations.

21. The system of claim 20 wherein:
said plural color components comprise three color components, namely Y, I and Q; and
each of said first and second groups of memories comprises:
  an odd Y memory comprising those of said first and third sets of memory locations, respectively, associated wtih said Y component,
  an even Y memory comprising those of said second and fourth sets of memory locations, respectively, associated with said Y component,
  an odd I/Q memory comprising those of said first and third sets of memory locations, respectively, associated with said I and Q components, and
  an even I/Q memory comprising those of said second and fourth sets of memory locations, respectively, associated with said I and Q components.

22. The system of claim 21 wherein said odd and even I/Q memories each comprise a two-port random access memory integrated circuit partitionable into an I address block and a Q address block, each of said blocks being dedicated to store a corresponding set of video data associated with said I and Q components, respectively.

23. The system of claim 20 wherein each of said memories comprises a dual port random access memory integrated circuit characterized by a maximum data reading capacity.

24. The signal processing system of claim 23 further comprising:
means for playing back a video signal previously recorded as a time division multiplexed video signal on a magnetic medium;
an analog-to-digital converter connected between said playback means and said output/input means;
an output node; and
a digital-to-analog converter having its digital input connected to said input/output means and its analog output connected to said output node.

* * * * *